US010430516B2

(12) United States Patent
Shirolkar et al.

(10) Patent No.: US 10,430,516 B2
(45) Date of Patent: Oct. 1, 2019

(54) AUTOMATICALLY DISPLAYING SUGGESTIONS FOR ENTRY

(71) Applicant: MICROSOFT TECHNOLOGY LICENSING, LLC, Redmond, WA (US)

(72) Inventors: Prashant A Shirolkar, Kirkland, WA (US); Daniel Battagin, Seattle, WA (US); Johnny Campbell, Renton, WA (US); Benjamin Chamberlain, Woodinville, WA (US); Aaron Lamar Wilson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 232 days.

(21) Appl. No.: 13/917,429

(22) Filed: Jun. 13, 2013

(65) Prior Publication Data
US 2014/0372933 A1 Dec. 18, 2014

(51) Int. Cl.
G06F 3/00 (2006.01)
G06F 17/27 (2006.01)
G06F 9/451 (2018.01)

(52) U.S. Cl.
CPC ............ *G06F 17/276* (2013.01); *G06F 9/453* (2018.02)

(58) Field of Classification Search
CPC . G06F 17/30575; G06N 5/02; G06Q 30/0631
USPC ........................ 715/705, 708, 715
See application file for complete search history.

(56) References Cited

U.S. PATENT DOCUMENTS

| 5,845,300 | A | 12/1998 | Comer et al. |
| 6,626,959 | B1 | 9/2003 | Moise et al. |
| 6,766,069 | B1 | 7/2004 | Dance et al. |
| 7,451,397 | B2 | 11/2008 | Weber et al. |
| 7,707,486 | B2 | 4/2010 | Genesereth et al. |
| 9,037,598 | B1 * | 5/2015 | Morton ............. G06F 17/30474 707/706 |

(Continued)

FOREIGN PATENT DOCUMENTS

GB 2365150 A 2/2002

OTHER PUBLICATIONS

"International Search Report and Written Opinion Issued in PCT Patent Application No. PCT/US2014/040198", dated Jan. 28, 2015, 9 Pages.

(Continued)

*Primary Examiner* — Di Xiao

(57) ABSTRACT

Suggestions are automatically displayed in response to an event. For example, suggestions may be automatically displayed in response to a receiving an indication from a user to enter content (e.g. receiving a selection of a content entry area). The suggestions may be displayed before a user enters any characters and before an input device is displayed and/or used (e.g. keyboard, Software Input Panel (SIP), and the like. Suggestions may also be automatically displayed in response to detecting a pause while a user is entering content. For example, when a user is actively entering content, suggestions are not automatically displayed but when a user pauses a predetermined amount while entering content, suggestions are automatically displayed. The suggestions may be determined from content that may be seen on a display and/or hidden from view (e.g. hidden rows in a spreadsheet).

20 Claims, 12 Drawing Sheets

(56) References Cited

U.S. PATENT DOCUMENTS

| | | | |
|---|---|---|---|
| 9,547,420 B1* | 1/2017 | Cassidy | G06F 3/0484 |
| 2003/0033288 A1 | 2/2003 | Shanahan et al. | |
| 2007/0055922 A1 | 3/2007 | Martynov et al. | |
| 2009/0204926 A1* | 8/2009 | Cochrane | G06F 8/33 |
| | | | 715/781 |
| 2009/0228513 A1* | 9/2009 | Tian | G06Q 10/10 |
| 2010/0231523 A1* | 9/2010 | Chou | G06F 3/018 |
| | | | 345/171 |
| 2010/0325173 A1 | 12/2010 | Haley et al. | |
| 2011/0161182 A1 | 6/2011 | Racco | |
| 2011/0202876 A1* | 8/2011 | Badger | G06F 3/0237 |
| | | | 715/816 |
| 2012/0137254 A1* | 5/2012 | Cunningham | G06Q 10/107 |
| | | | 715/835 |
| 2013/0036346 A1 | 2/2013 | Cicerone | |
| 2013/0091411 A1* | 4/2013 | Rampson | G06F 3/0237 |
| | | | 715/224 |

OTHER PUBLICATIONS

"Use Formula AutoComplete", Retrieved on: Apr. 3, 2013, Available at: http://office.microsoft.com/en-us/excel-help/use-formula-autocomplete-HA010082293.aspx.

"Entering Data in Excel", Retrieved on: Apr. 4, 2013, Available at: http://spreadsheets.about.com/od/excel101/ss/enter_data_5.htm.

"How to Enable Autocomplete in Google Docs Spreadsheet", Published on: Aug. 24, 2011, Available at: http://blogmines.com/blog/2011/08/24/how-to-enable-autocomplete-in-google-docs-spreadsheet/.

"Search and Auto-Complete in Bi-Directional Lookup Fields", Retrieved on: Apr. 4, 2013, Available at: https://forums.zoho.com/topic/search-and-auto-complete-in-bi-directional-lookup-fields.

"Bing", Retrieved on: Apr. 4, 2013, Available at: www.bing.com.

"Written Opinion Received for PCT Application No. PCT/US2014/40198", dated Jul. 10, 2015, 5 Pages.

"International Preliminary Report on Patentability Issued in PCT Application No. PCT/US2014/40198", dated Sep. 14, 2015, 6 Pages.

* cited by examiner

Mobile Computing Device

US 10,430,516 B2

AUTOMATICALLY DISPLAYING SUGGESTIONS FOR ENTRY

BACKGROUND

AutoComplete is used by a variety of different programs to assist a user in entering data as they are typing. For example, web browsers, word-processing programs, and spreadsheets are just a few examples that include autocomplete functionality. Generally, autocomplete suggests possible matches for entries as a user types data (e.g. in an Address bar, a Web page form, a document, and the like). AutoComplete displays suggestions in a list as soon as a match exists and filters the displayed suggestions as the user types. A user may select one of the displayed suggestions to complete an entry. Autocomplete may be used on different types of devices, such as desktop devices, laptops, mobile devices and touch/non-touch devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Suggestions are automatically displayed in response to an event. One or more events may be used to determine when to automatically display suggestions. For example, suggestions may be automatically displayed in response to a receiving an indication from a user to enter content (e.g. receiving a selection of a data entry area). The suggestions may be displayed before a user enters any characters and before an input device is displayed and/or used (e.g. keyboard, Software Input Panel (SIP), and the like). For example, when a user selects a cell within a column of a spreadsheet, unique entries from that column may be automatically displayed for selection. Suggestions may also be automatically displayed in response to detecting a pause while a user is entering content. For example, when a user is actively entering content, suggestions are not automatically displayed but when a user pauses a predetermined amount of time while entering content, suggestions are automatically displayed. The suggestions include content that is determined to be related to the content area being interacted with. For example, the suggestions may include data from rows and/or columns of a spreadsheet, related content from the document or outside of the document, predetermined types of content, and the like. As the user begins entering additional content, the automatically displayed suggestions may be filtered to match the entered content. The suggestions may be determined from content that is visible and/or hidden from view (e.g. hidden rows in a spreadsheet and/or content that is obtained other sources or services).

DETAILED DESCRIPTION

Figure 1:
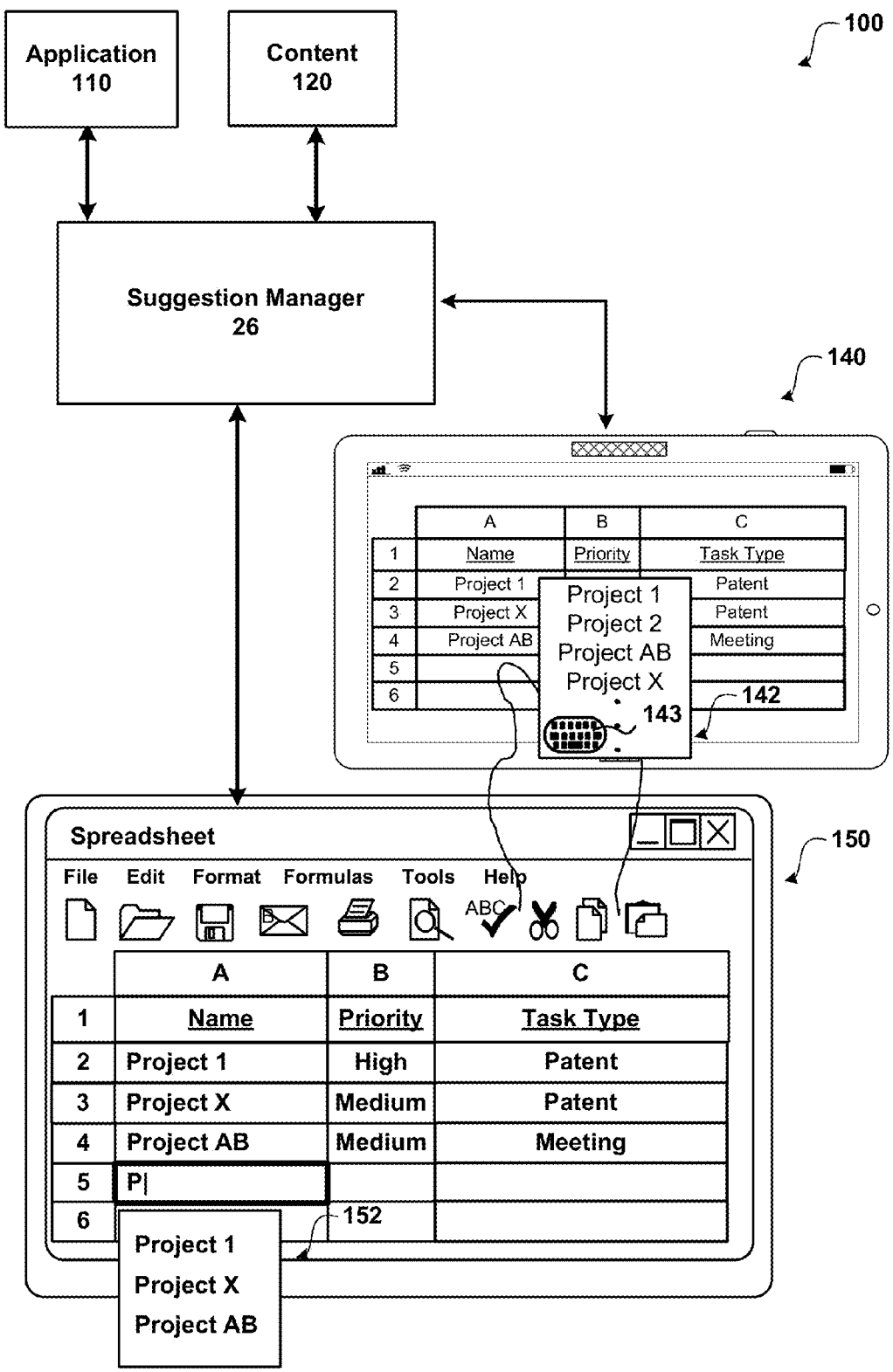
FIG. 1 shows a system for automatically providing suggestions.

Referring now to the drawings, in which like numerals represent like elements, various embodiment will be described elements, various embodiment will be described.

FIG. 1 shows a system for automatically providing suggestions.

As illustrated, system 100 includes suggestion manager 26, application 110, content 120, tablet 140, and computing device 150.

Generally, suggestion manager 26 is configured to automatically display suggestions in response to an event associated with a content entry area. Suggestions may be displayed before any content is received and/or suggestions may be displayed after a pause is detected during entry of content. The content may relate to different types of content (e.g. spreadsheets, tables, objects, text, structured content, data fields, and the like) that may be obtained from different sources (e.g. an application, a service . . . ). The suggestions may be obtained from the content being interacted with and/or the suggestions may be obtained from content that a service or some other application determines is relevant. For example, the suggestions that are displayed may be received from a service or a data source that is not included in a document currently being displayed. While suggestion manager 26 is shown separate from tablet 140, and computing device 150 (e.g. within an online service or some network location), all or a portion of the suggestion manager 26 may be included within tablet 140, and computing device 150.

Tablet 140 shows a user using touch input to select cell A5. In response to receiving the touch selection of cell A5, suggestions 142 are automatically displayed before any content has been entered into cell A5. The suggestions that are automatically displayed include content that is determined to be related to the content area being interacted with but may or may not reside in the document that is being displayed. For example, the content may be obtained from a search engine or some other source that locates related content. Instead of having a Software Input Panel (SIP) automatically displayed when cell A5 is selected, a user may select a value from suggestions 142 without the SIP even being displayed. In the current example, the automatically displayed suggestions 142 may include the unique content that is obtained from the current column (A) of the displayed spreadsheet. The related content may include content stored on a device as well as content obtained from one or more other locations. For example, a portion of the spreadsheet content may be stored at content location 120 (e.g. a data store/online service/ . . . ). A user may select one of the automatically displayed suggestions from suggestions 142 to fill in the selected cell with content. A user may also select an option (e.g. keyboard icon 143) to display a SIP and/or some other input method to enter content.

Device 150 shows a display of a spreadsheet. The spreadsheet may be a web spreadsheet and/or a spreadsheet associated with an application on computing device 150. In the current example, a user has started to enter content within cell A5 of a spreadsheet (e.g. using a keyboard). In response to detecting a pause of a specified duration, suggestions 152 are automatically displayed. Instead of immediately displaying suggestions as autocomplete functions typically do, the suggestions are not initially displayed until a pause is detected. When the user does not pause a predetermined amount of time between content entry within the content area (e.g. cell A5) then suggestions are not automatically displayed. According to an embodiment, after the suggestions are displayed, the list of the displayed suggestions is automatically filtered in response to the user entering content without waiting for the pause. The suggestions displayed in response to the detection of the pause include content that is determined to be related to the content area being interacted with. The suggestions may or may not come from the content being interacted with. For example, suggestions may include data from rows and/or columns of a spreadsheet, related content, predetermined types of content, and the like. The suggestions may also include data determined to be relevant by some other source or service. The suggestions may be determined from content that may be seen on a display and/or hidden from view (e.g. hidden rows in a spreadsheet and/or content that is obtained from another source).

In order to facilitate communication with the suggestion manager 26, one or more callback routines, may be implemented. Application 110 may also receive input from a touch-sensitive input device 140 and/or other input devices.

For example, keyboard input (e.g. a physical keyboard and/or SIP), voice input, video based input, and the like. Application program 110 may also be configured to provide multimodal output (e.g. speech, graphics, vibrations, sounds, . . . ). Suggestion manager 26 may provide information to/from application 110 in response to user input (e.g. speech/gesture/touch/keyboard/ . . . ). Gestures may include, but are not limited to: a pinch gesture; a stretch gesture; a select gesture (e.g. a tap action on a displayed element); a select and hold gesture (e.g. a tap and hold gesture received on a displayed element); a swiping action and/or dragging action; and the like.

System 100 as illustrated comprises one or more touch screen input devices that detect when a touch input has been received (e.g. a finger touching or nearly teaching the touch screen). Any type of touch screen may be utilized that detects a user's touch input. More details are provided below.

Figure 2:
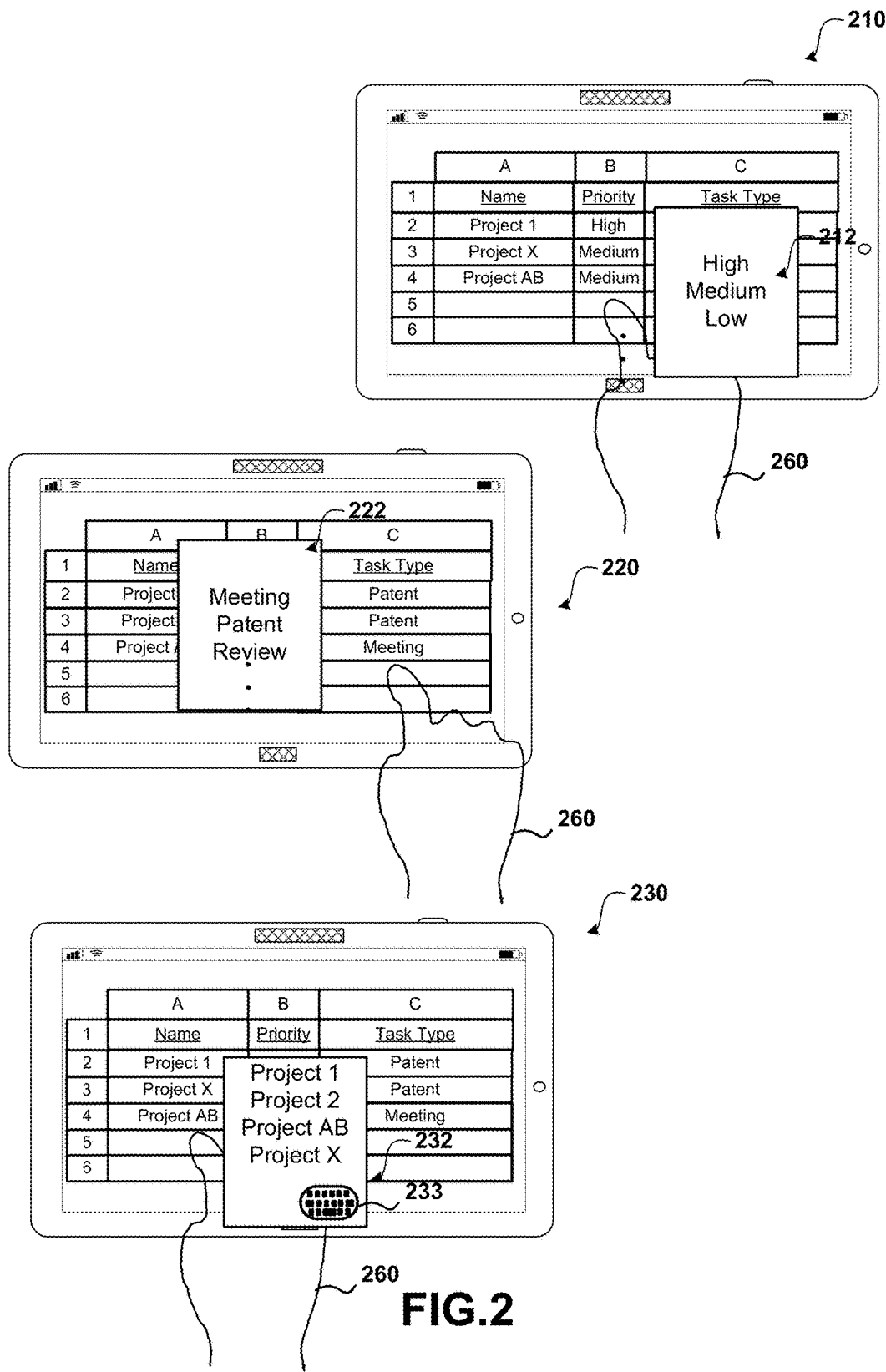
FIG. 2 shows automatically displaying suggestions before a user enters content.

FIG. 2 shows automatically displaying suggestions before a user enters content.

Display 210 shows a user 260 touching cell B5. In response to receiving the touch selection of the empty cell B5, suggestions 212 are automatically displayed. According to an embodiment, suggestions 212 are automatically displayed before either a SIP is displayed for receiving content entry or input is received for entry into the selected content area (e.g. cell B5). In the current example, the suggestions displayed in suggestions 212 are the unique entries from column B (the column labeled "Priority"). According to an embodiment, each unique entry within the column is displayed whether or not the content is hidden or not hidden. According to another embodiment, a top number of suggestions may be displayed (e.g. the entries most commonly entered). A user may select one of the displayed suggestions 212 to enter the selected suggestion in cell B5. According to an embodiment, a user may also select a SIP option to display a SIP for data entry. Other input methods may also be used. For example, a user may select an option to enter content into the selected cell using some other input method (not shown). For example, a user may enter input using a gesture, speech input, keyboard input, and the like.

Display 220 shows a user 260 touching cell C5. In response to receiving the touch selection of the empty cell C5, suggestions 222 are automatically displayed. In the current example, the suggestions displayed in suggestions 222 are the unique entries from column C (the column labeled "Task Type"). A user may select one of the displayed suggestions to enter the selected suggestion in cell C5. A user may also choose to use some other input method.

Display 230 shows a user touching cell A5. In response to receiving the touch selection of the empty cell A5, suggestions 232 are automatically displayed. In the current example, the suggestions displayed in suggestions 232 are the unique entries from column A (the column labeled "Name"). A user may select one of the displayed suggestions to enter the selected suggestion in cell A5. A user may also choose to use some other input method. For example, a user may select the SIP icon 233 to display a SIP to receive content entries.

Figure 3:
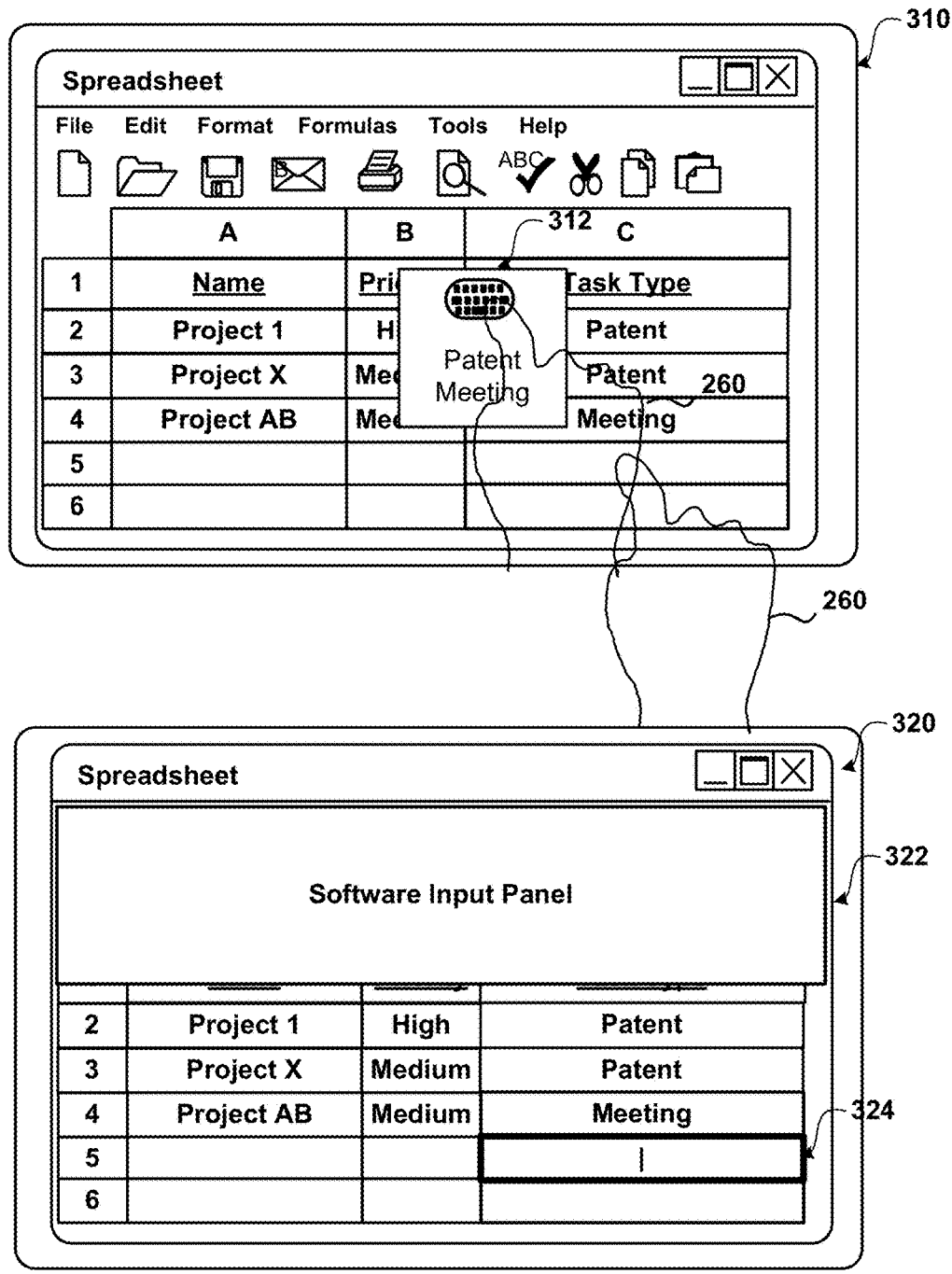
FIG. 3 illustrates automatically suggesting entries and displaying a Software Input Panel (SIP) after selection.

FIG. 3 illustrates automatically suggesting entries and displaying a Software Input Panel (SIP) after selection.

Display 310 shows a user initially touching cell C5. In response to receiving the touch selection of the cell C5 by user 260, suggestions 312 are automatically displayed. In the current example, the suggestions displayed in suggestions 312 are the unique entries from column C (the column labeled "Task Type"). After the suggestions are displayed, the user 260 selects the SIP icon displayed with/near the suggestions to select a SIP to be displayed.

Display 320 shows SIP 322 being displayed in response to selecting the SIP option displayed with suggestions shown in suggestions 312. Instead of initially displaying a SIP in response to selecting a cell, the SIP is displayed in response to a user selection of the SIP after the suggestions are initially displayed.

Figure 4:
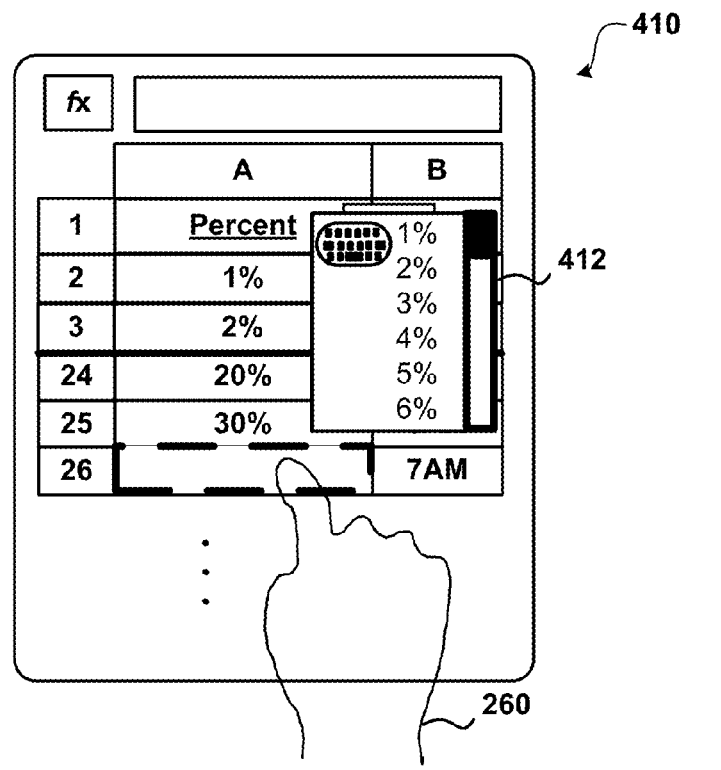
FIG. 4 shows displaying suggestions determined from hidden data and non-hidden data.
Figure 4:
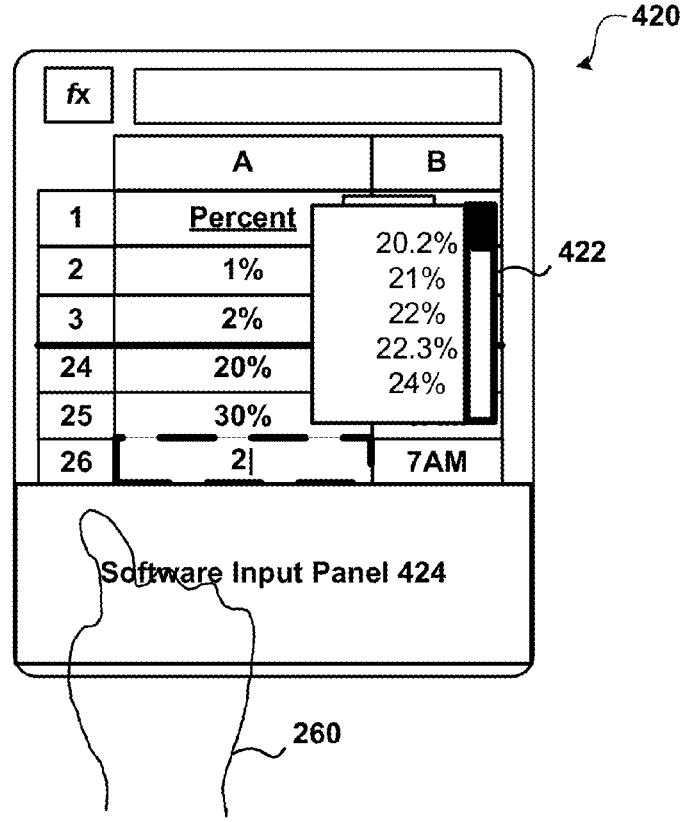

FIG. 4 shows displaying suggestions determined from hidden data and non-hidden data.

Display 410 shows a user 260 initially touching cell A26. In response to receiving the selection of the cell A26, suggestions 412 are automatically displayed. In the current example, the suggestions displayed include the unique entries from column A (the column labeled "Percent"). The suggestions include content from column A that is shown as well as content from hidden rows. In the current example, rows 4-23 are illustrated as being hidden. The hidden data may be stored on the device and/or at another location (e.g. network data store). The current example illustrates displaying a slider bar with the display of the suggestions that may be used for navigating the selections. A user may select one of the suggestions or select an option of a SIP to be displayed.

Display 420 shows a user 260 entering data into cell A26 using SIP 424. Some other input method may be used (e.g. a keyboard, gesture(s), . . . ). In response to detecting a pause (e.g. about ½ second, ¾ second, . . . ) while receiving user input, suggestions 422 are automatically displayed. The suggestions include content from column A that is shown as well as content from hidden rows. In the current example, rows 4-23 are illustrated as being hidden. The hidden data may be stored on the device and/or at another location (e.g. network data store). The current example illustrates displaying suggestions that are filtered in response to the currently received user input (e.g. "2" in this example).

Figure 5:
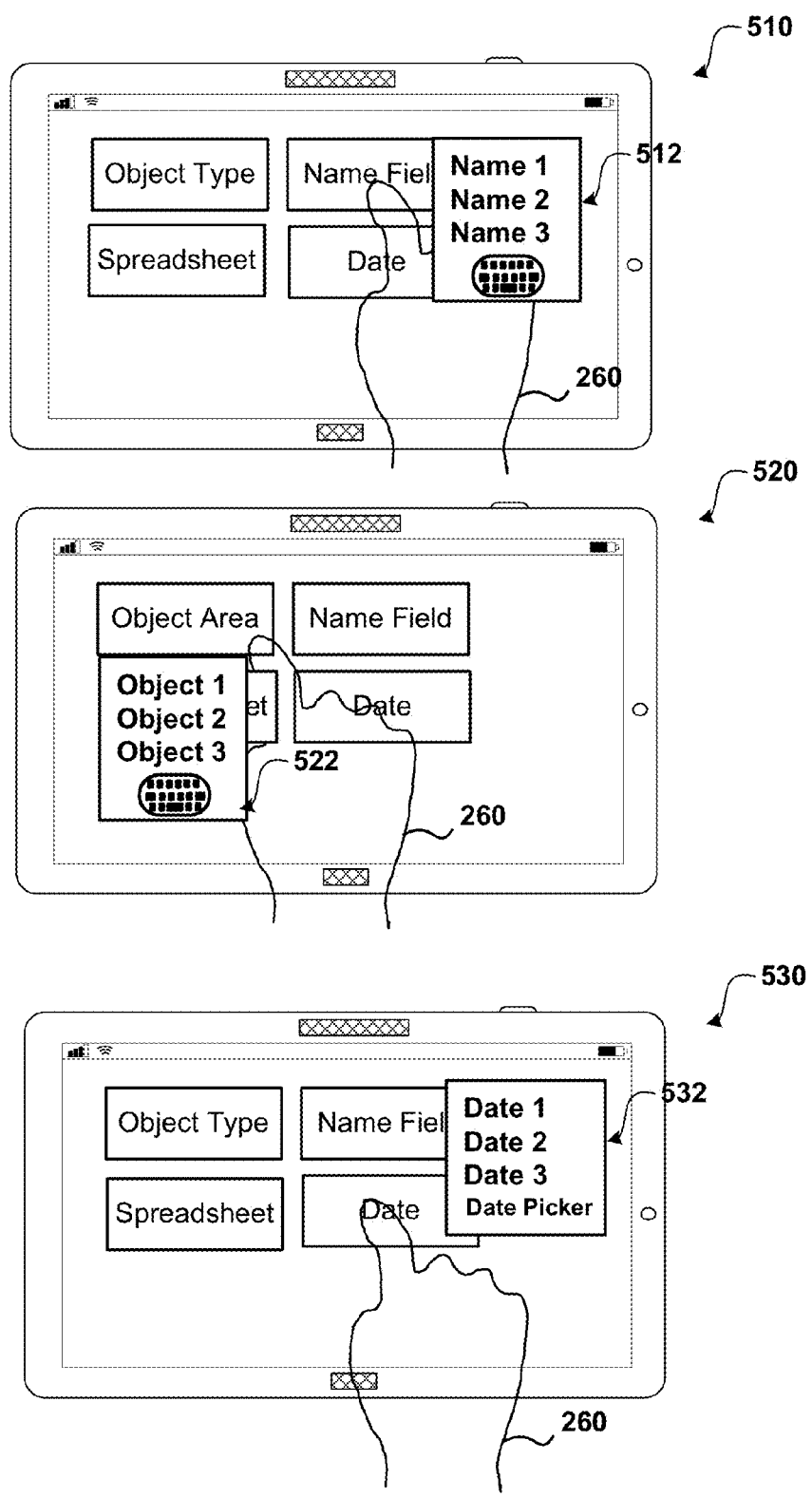
FIG. 5 illustrates suggestions automatically displayed before a user enters content.

FIG. 5 illustrates suggestions automatically displayed before a user enters content.

Display 510 shows a display of different type of content and different content areas in which a user may enter content. As illustrated, there is an object type content area, a name field content area, a spreadsheet content area, and a date content area. Other content areas may also be included. In the current example, the user 260 selects a name field content area that is configured to receive a name. In response to receiving selection of the name field (e.g. touch, gesture, mouse, or some other input method), suggestions 512 are displayed from which a user may select an entry to fill in the name field. Suggestions 512 include suggestions determined from related content and/or other data. For example, the name field may specify a predetermined number of acceptable entries, other names may have already been entered, and the like. A user may select one of the suggestions or select an option of a SIP to be displayed. The suggestions may be displayed using other methods. For example, the suggestions may be displayed in: a selected cell; a drop down menu; another type of list, and the like. Generally, the suggestions are displayed such that a user may easily select a suggestion. In the current example, the suggestions are text names. The suggestions may also be other types of data. For example, the suggestions may be images, videos, audio files, different types of documents, and the like.

Display 520 shows a user selecting an object content area that is configured to display an object. For example, the object area may be configured to display different types of object, such as charts, graphs, pictures, and the like. In response to receiving selection of the object content area (e.g. touch, gesture, mouse, or some other input method), suggestions 522 are displayed from which a user may select an object to display in the object area. Suggestions 522 include suggestions determined from related content and/or other data. For example, the objects displayed (e.g. charts, graphs, pictures, videos, . . . ) as suggestions may already be included in the same document and/or an associated document. A user may select one of the objects or select an option of a SIP to be displayed.

Display 530 shows a user 260 selecting a date field content area that is configured to receive a data entry. In response to receiving selection of the date content area (e.g. touch, gesture, mouse, or some other input method), suggestions 532 are displayed from which a user may select a date. Suggestions 532 may include previously entered dates/ dates determined from a current context (e.g. the current month) and the like. A user may select one of the dates or select an option to display a date picker.

Figure 6:
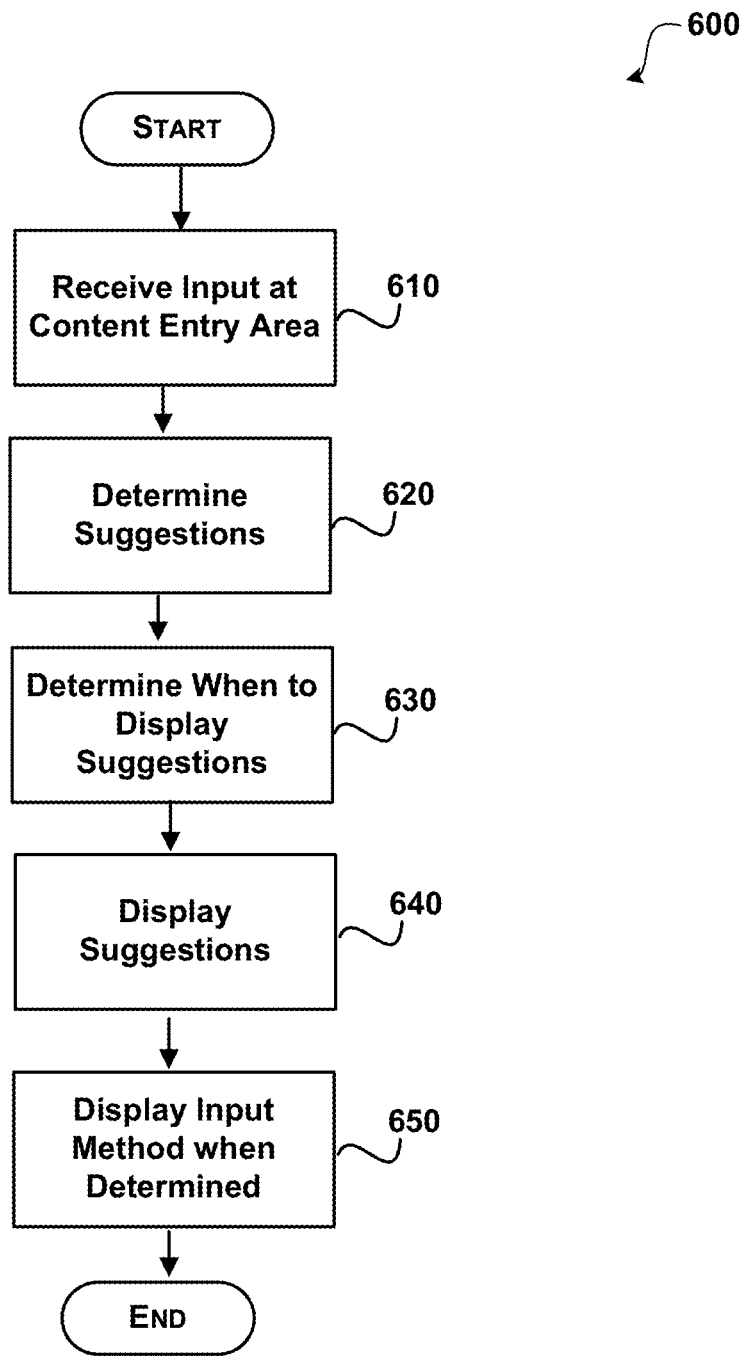
FIG. 6 shows a process for automatically displaying suggestions before a Software Input Panel is displayed or before content entry is received from a user.
Figure 7:
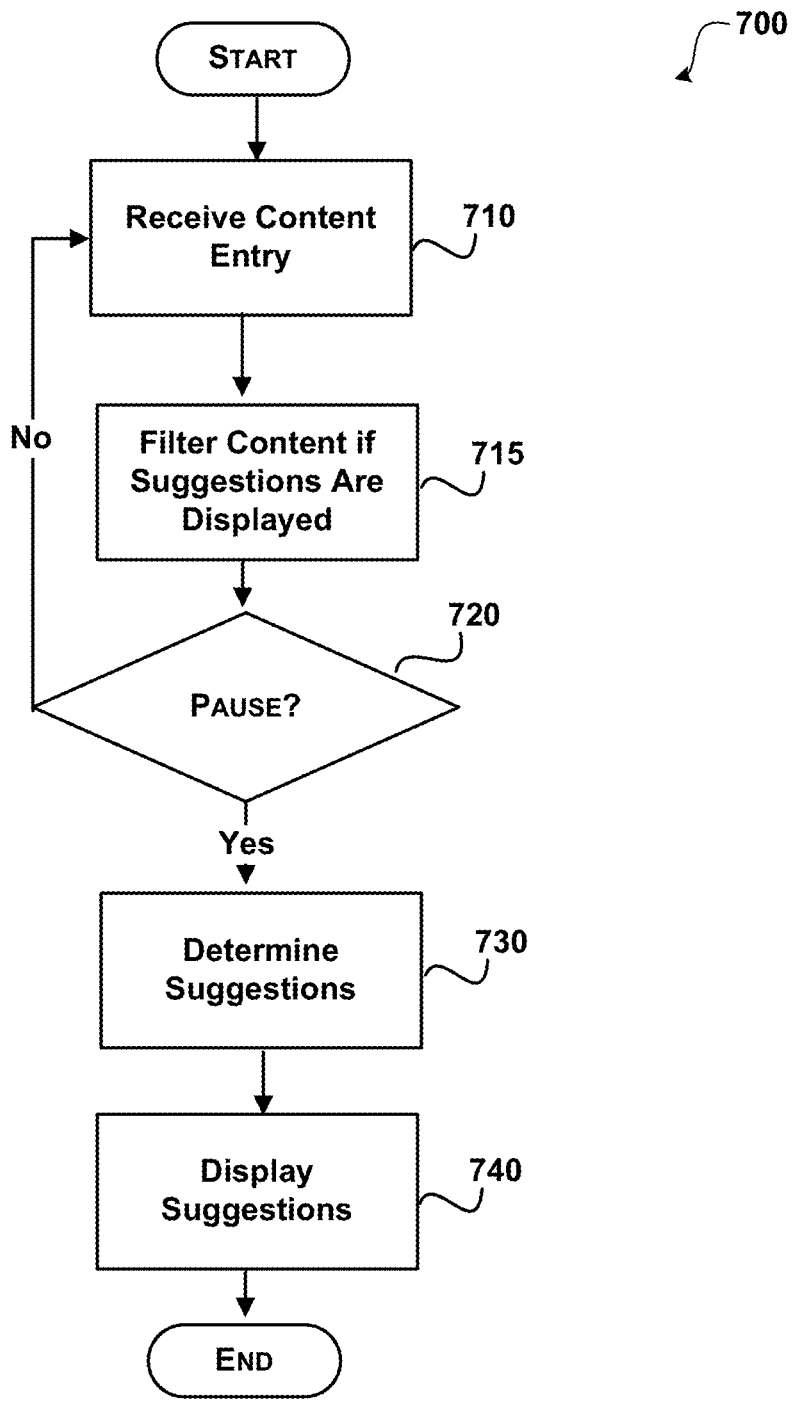
FIG. 7 shows a process for automatically displaying suggestions after a pause is detected during content entry.
Figure 8:
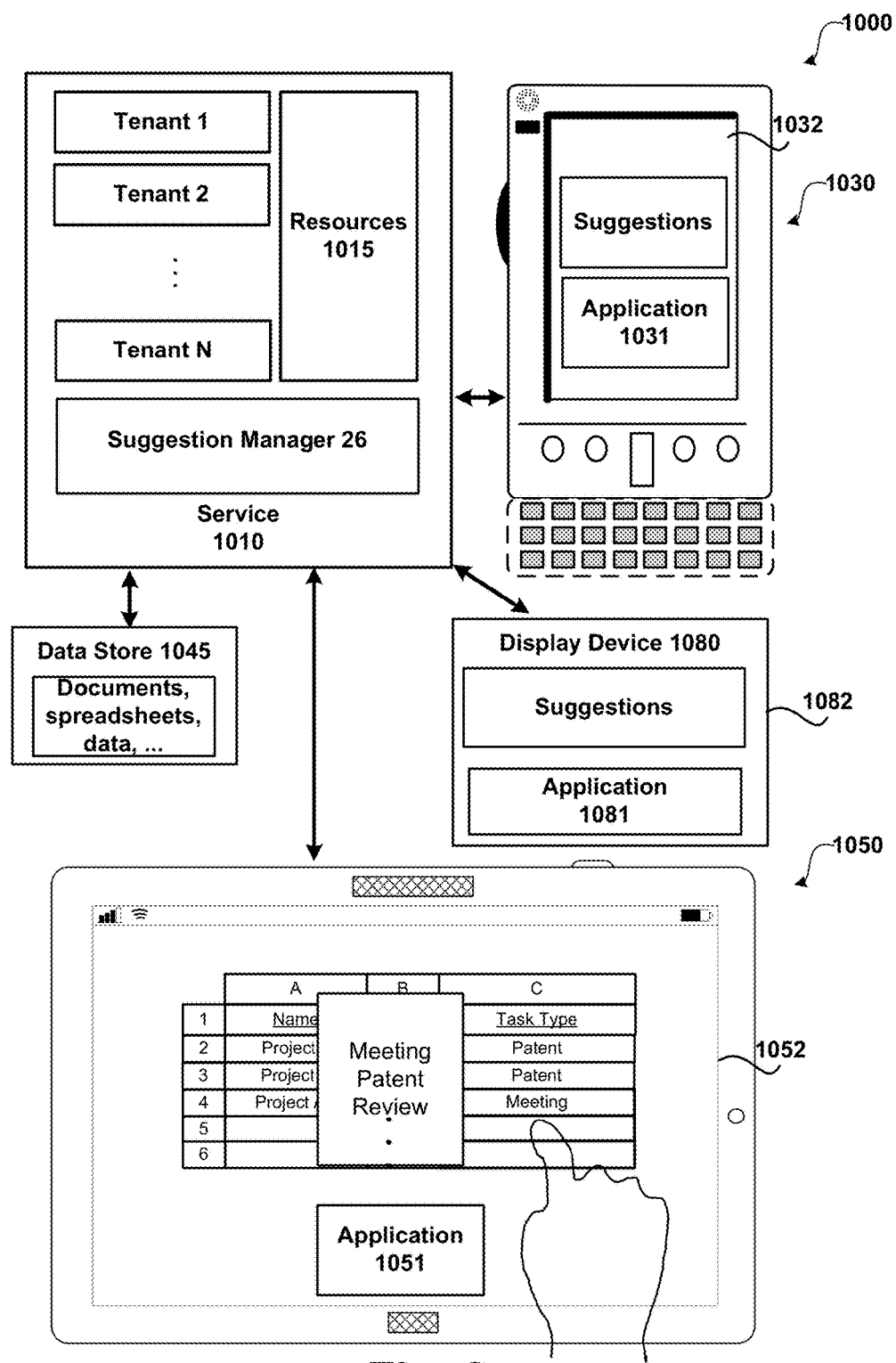
FIG. 8 illustrates an exemplary online system that automatically displays suggestions.

FIGS. 6-8 illustrates processes relating to automatically displaying suggestions. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof While the operations are shown in a particular order, the order of the operations may change, be performed in parallel, depending on the implementation.

FIG. 6 shows a process for automatically displaying suggestions before a Software Input Panel is displayed or before content entry is received from a user.

After a start operation, the process moves to operation 610, where an input is received that is associated with a content entry area. The input may be received using different input methods (e.g. touch, gesture, speech, and the like). For example, a user may use touch input to select a content entry area (e.g. a cell in a spreadsheet, an element in a table, a field, and the like). A user may use a SIP and/or keyboard to enter content into the content entry area.

Flowing to operation 620, the suggestions to automatically display are determined Generally, the suggestions are determined from related content that is associated with the content area being interacted with. For example, the content may be determined from a same column/row, related columns/rows, defined fields, linked content, and the like. According to an embodiment, the determined suggestions include unique content within the determined related content. The related content may include hidden content. For example, a portion of the content of a displayed document may not be shown (e.g. hidden rows of a spreadsheet, hidden columns of a spreadsheet, and the like). When data to display is obtained from an external location (e.g. an online service or a remote server), the data (hidden and non-hidden) may be stored locally (e.g. in a cache and/or some other storage or memory location). The related content may include content stored on a device being used by the user as well as content obtained from one or more other locations, such as a network/internet service. For example, all/portion of the suggestions may be received from an online service, an external data store, a network data store, and the like.

Transitioning to operation 630, a determination is made as to when to display the suggestions. According to an embodiment, the suggestions are displayed before a content entry is received from a user and before a SIP is displayed when the input is a selection of the content entry area. Generally, the determination to display the suggestions relates to an indication that the user desires to enter content. One indicator may be when a user selects a cell and they are in an edit mode. For example, if the user is in a read mode then they would not want the suggestions to display and as such the suggestions would not be displayed. Other indications may also be used. For example, if a user has added some other piece of data to a tabular range of data where their cell selection resides then the suggestions are displayed. For example, the suggestions are displayed before a user is presented with another option to enter content into the content area. A determination may be made as to whether the related content to the content entry area includes duplicate entries and/or how many duplicate entries. For example, duplicate entries in the related content may indicate a more likely chance of a user selecting one of the suggestions. When the input is a content entry and a pause is detected since a last content entry, the suggestions are initially displayed. According to an embodiment, the suggestions are filtered based on the content entry already received. (See FIG. 7 and related discussion).

Flowing to operation 640, the suggestions are displayed. A user may select one of the displayed suggestions, dismiss the suggestions and/or make a selection to display an another input method to enter content in the content area.

Moving to operation 650, an input method is displayed when determined For example, a SIP may be displayed in response to a user selecting an option (e.g. on/near the display of the suggestions) to display a SIP.

The process then moves to an end operation and returns to processing other actions.

FIG. 7 shows a process for automatically displaying suggestions after a pause is detected during content entry.

After a start operation, the process moves to operation 710, where a content entry is received. For example, a user may begin typing in a content area (e.g. a cell, field, . . . ).

Moving to operation 715, the suggestions may be filtered if there are currently suggestions that are displayed. For example, as a user types any displayed suggestions may be filtered based on the content entry.

Flowing to decision operation 720, a determination is made as to whether there has been a pause since the received content entry. A pause may be determined using a time period of a specified duration since the last content entry. The time duration may be predetermined (e.g. greater than ½ second, greater than 1 second, greater than 2 seconds, . . . ) and/or determined from other methods (e.g. user typing characteristics such as speed of typing, type of content entry, and the like). According to an embodiment, the time duration of when a pause is initially detected is between 400-800 ms. Generally, a pause is not detected when a user is continuously typing.

When a pause is not detected, the process returns to operation 710 to receive further content entries. When a pause is detected, the process flows to operation 730.

At operation 730, the suggestions to display are determined Generally, the suggestions are determined from related content that is associated with the content area being interacted with. For example, the content may be determined from a same column/row, related columns/rows, defined fields, linked content, and the like. The content may be hidden/non-hidden. According to an embodiment, the determined suggestions include unique content within the determined related content that are filtered based on the currently received content. The related content may include content stored on a device being used by the user as well as content obtained from one or more other locations. For example, all/portion of the suggestions may be received from an online service, an external data store, a network data store, and the like. The content used for determining the suggestions may be content that is not part of a document being interacted with. For example, an online service may determine that content that is not included in the document should be included as suggestions.

Flowing to operation 740, the suggestions are displayed. The suggestions may be updated in response to another content entry received. For example, the displayed suggestions may be filtered in response to receiving a content entry (e.g. a user types an "s" and the suggestions that are displayed include an "s" in their name). Many different filtering methods may be used.

The process then moves to an end operation and returns to processing other actions.

FIG. 8 illustrates an exemplary online system that automatically displays suggestions. As illustrated, system 1000 includes service 1010, data store 1045, touch screen input device 1050 (e.g. a slate), smart phone 1030 and display device 1080.

As illustrated, service 1010 is a cloud based and/or enterprise based service that may be configured to provide services, such as multimodal services related to productivity services (e.g. spreadsheets, documents, presentations, charts, messages, and the like), as well as other applications or services. The service may be interacted with using different types of input/output. For example, a user may use speech input, touch input, hardware based input, and the like. The service may provide speech output that combines pre-recorded speech and synthesized speech. Functionality of one or more of the services/applications provided by service 1010 may also be configured as a client/server based application.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030, touch screen input device 1050, and device 1080 are configured with multimodal input/output and each include an application (1031, 1051, 1081).

As illustrated, touch screen input device 1050, smart phone 1030, and display device 1080 shows exemplary displays 1052/1032/1082 showing the use of an application displaying suggestions. Data may be stored on a device (e.g. smart phone 1030, slate 1050 and/or at some other location (e.g. network data store 1045). Data store 1045, or some other store, may be used to store documents, spreadsheets, as well as other data. The applications used by the devices may be client based applications, server based applications, cloud based applications and/or some combination. According to an embodiment, display device 1080 is a device such as a MICROSOFT XBOX coupled to a display.

Suggestion manager 26 is configured to perform operations relating to automatically displaying suggestions as described herein. For example, suggestions may be automatically displayed based on a user selecting a cell within the spreadsheet as illustrated in display 1052. While manager 26 is shown within service 1010, the functionality of the manager may be included in other locations (e.g. on smart phone 1030 and/or slate device 1050 and/or device 1080).

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 9:
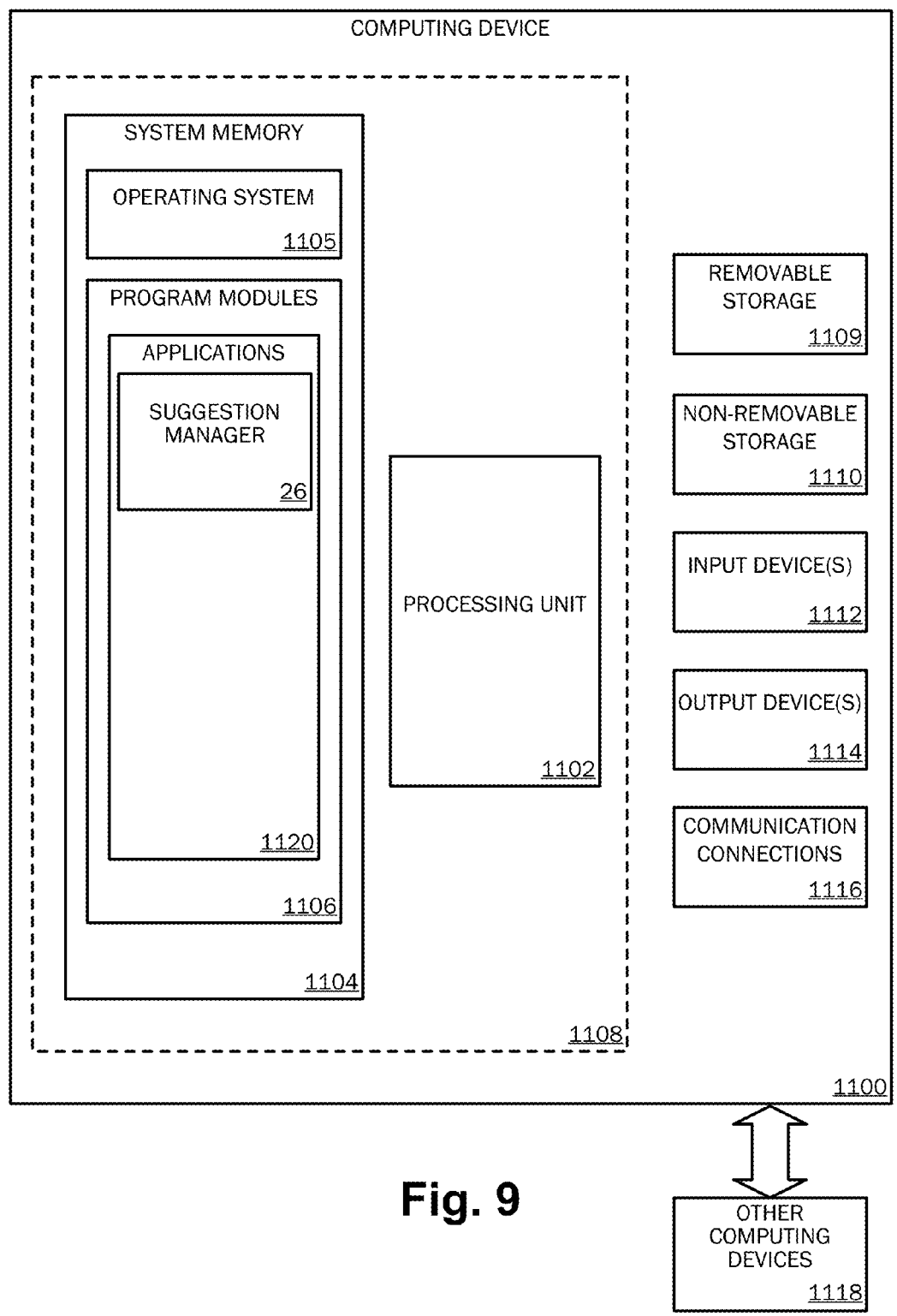
FIGS. 9, 10A, 10B and 11 and the associated descriptions provide a discussion of a variety of operating environments in which embodiments of the invention may be practiced.
Figure 10A:
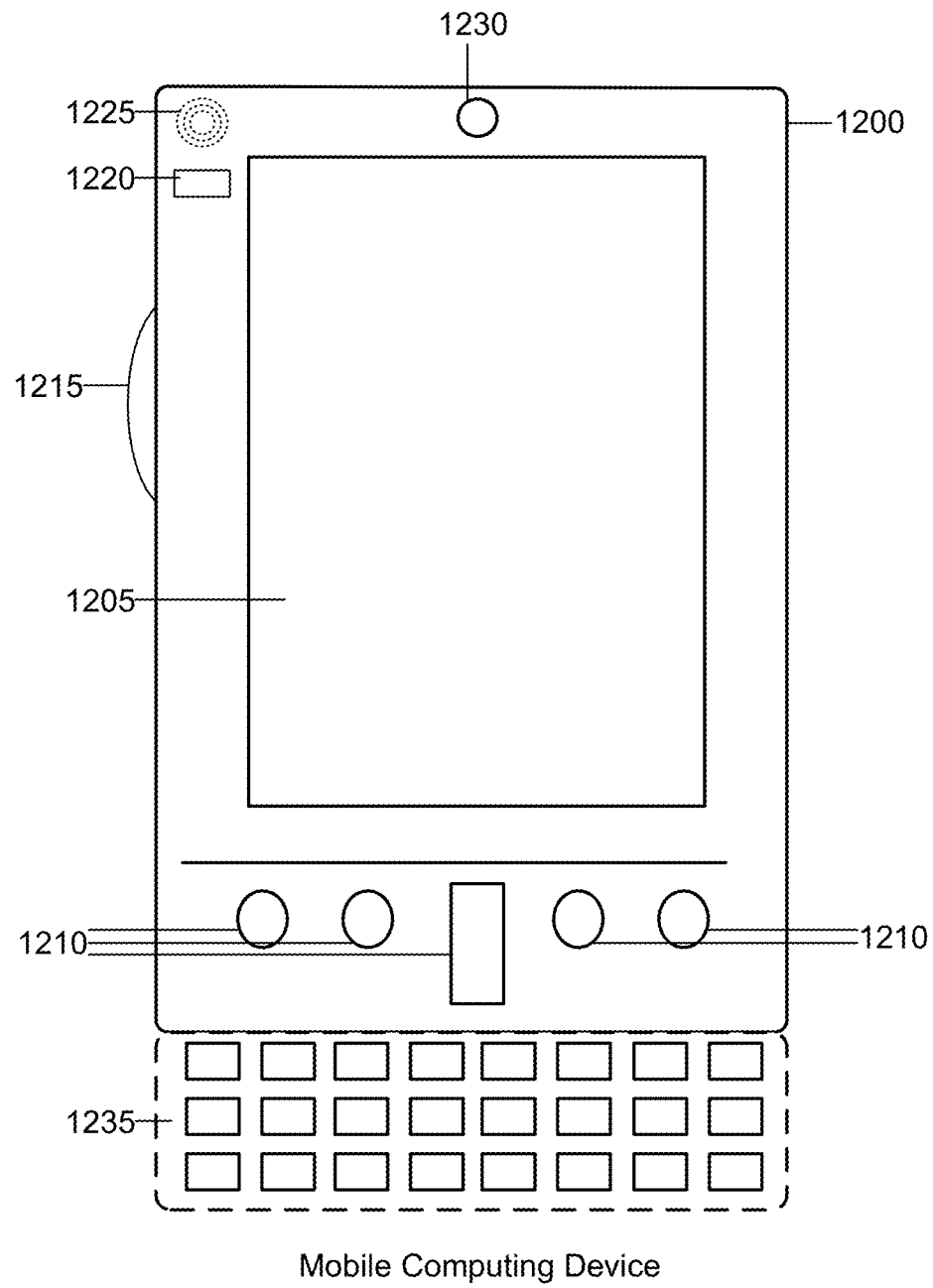
Figure 10B:
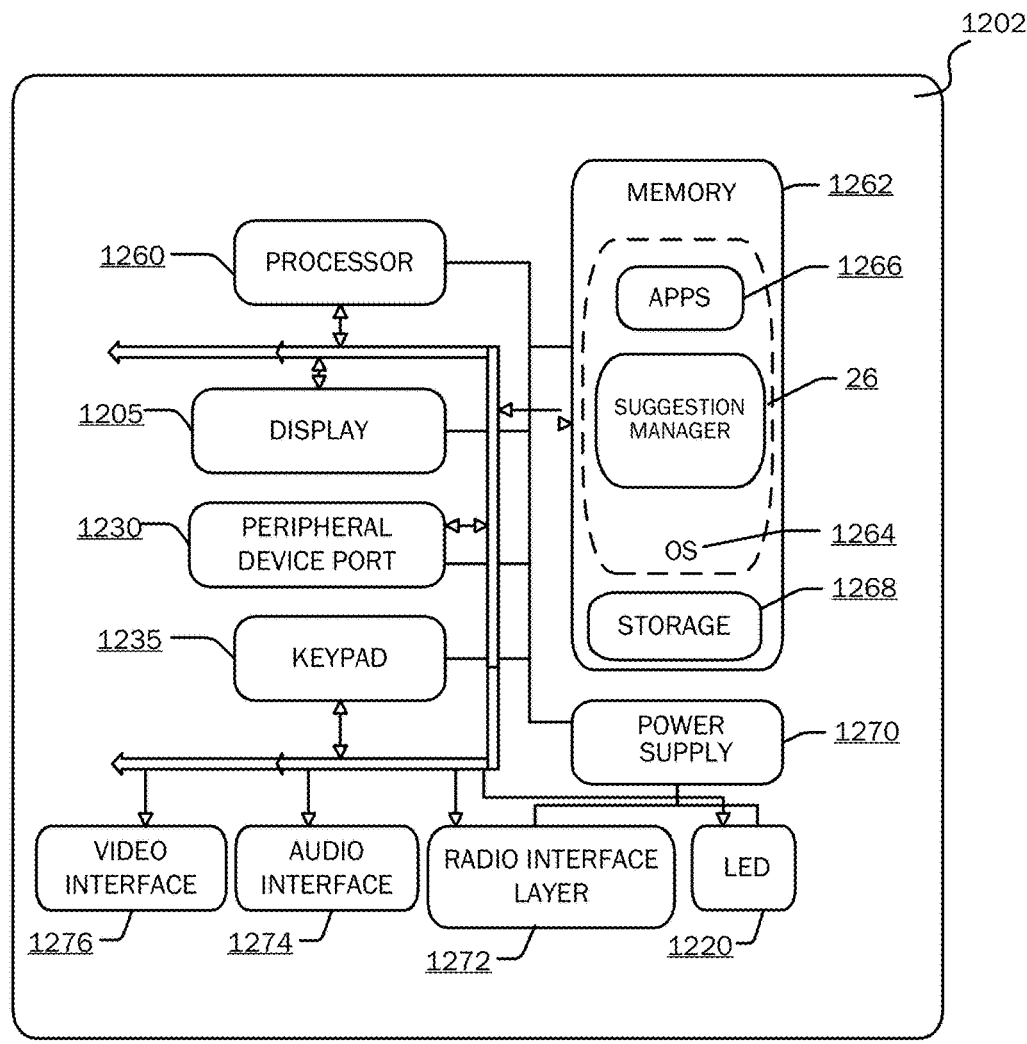
Figure 11:
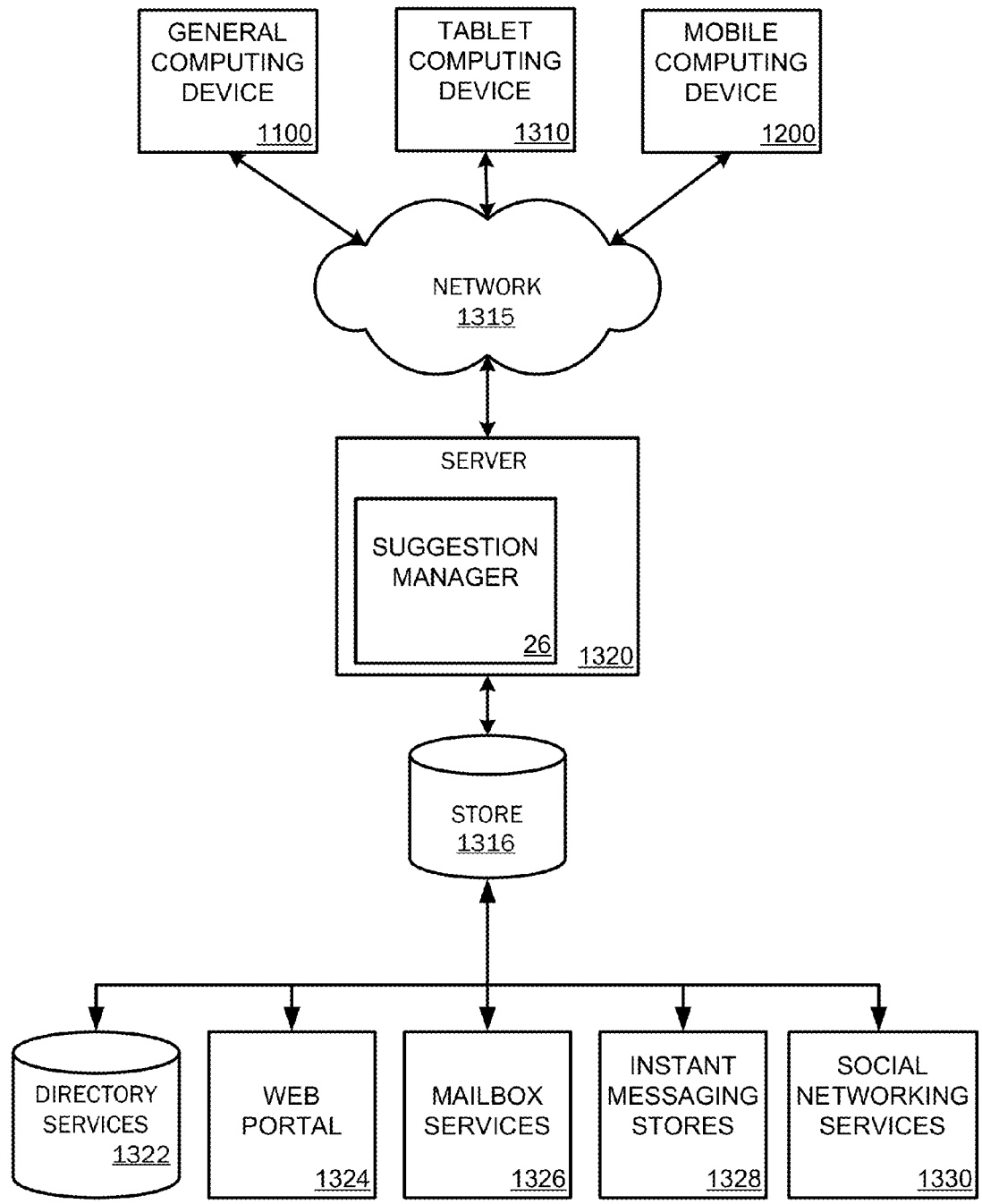

FIGS. 9-11 and the associated descriptions provide a discussion of a variety of operating environments in which embodiments of the invention may be practiced. However, the devices and systems illustrated and discussed with respect to FIGS. 9-11 are for purposes of example and illustration and are not limiting of a vast number of computing device configurations that may be utilized for practicing embodiments of the invention, described herein.

FIG. 9 is a block diagram illustrating physical components (i.e., hardware) of a computing device 1100 with which embodiments of the invention may be practiced. The computing device components described below may be suitable for the computing devices described above. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1120 such as the suggestion manager 26. The operating system 1105, for example, may be suitable for controlling the operation of the computing device 1100. Furthermore, embodiments of the invention may be practiced in conjunction with a graphics library, other operating systems, or any other application program and is not limited to any particular application or system. This basic configuration is illustrated in FIG. 9 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 7 by a removable storage device 1109 and a non-removable storage device 1110.

As stated above, a number of program modules and data files may be stored in the system memory 1104. While executing on the processing unit 1102, the program modules 1106 (e.g., the suggestion manager 26) may perform processes including, but not limited to, one or more of the stages of the methods and processes illustrated in the figures. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the suggestion manager 26 may be operated via application-specific logic integrated with other components of the computing device 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 10A and 10B illustrate a mobile computing device 1200, for example, a mobile telephone, a smart phone, a tablet personal computer, a laptop computer, and the like, with which embodiments of the invention may be practiced. With reference to FIG. 10A, one embodiment of a mobile computing device 1200 for implementing the embodiments is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative embodiments, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some embodiments, the mobile computing device 1200 incorporates a vibration transducer for providing the user with tactile feedback. In yet another embodiment, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one embodiment of a mobile computing device. That is, the mobile computing device 1200 can incorporate a system (i.e., an architecture) 1202 to implement some embodiments. In one embodiment, the system 1202 is implemented as a "smart phone" capable of running one or more applications (e.g., browser, e-mail, calendaring, contact managers, messaging clients, games, and media clients/players). In some embodiments, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the suggestion manager 26 as described herein.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present invention, the microphone may also serve as an audio sensor to facilitate control of notifications, as will be described below. The system 1202 may further include a video interface 1276 that enables an operation of an on-board camera to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 10B by the non-volatile storage area 1268. Mobile computing device 1200 may also include peripheral device port.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 11 illustrates an embodiment of an architecture of a system for automatically displaying suggestions for entry, as described above. Content developed, interacted with, or edited in association with the suggestion manager 26 may be stored in different communication channels or other storage types. For example, various documents may be stored using a directory service 1322, a web portal 1324, a mailbox service 1326, an instant messaging store 1328, or a social networking site 1330. The suggestion manager 26 may use any of these types of systems or the like for enabling data utilization, as described herein. A server 1320 may provide the suggestion manager 26 to clients. As one example, the server 1320 may be a web server providing the suggestion manager 26 over the web. The server 1320 may provide the suggestion manager 26 over the web to clients through a network 1315. By way of example, the client computing device may be implemented as the computing device 1100 and embodied in a personal computer, a tablet computing device 1310 and/or a mobile computing device 1200 (e.g., a smart phone). Any of these embodiments of the client computing device 1100, 1310, 1200 may obtain content from the store 1316.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A computer-implemented method for automatically displaying suggestions for data entry through user interaction, the method comprising:
receiving a selection of a content entry area shown on a display of a portion of a document, wherein the document comprises a hidden section and a non-hidden section, and wherein the display of the portion of the document comprises at least a part of the non-hidden section;
determining at least one suggestion for completing data entry, wherein the at least one suggestion for data input is based on the selected content entry area and at least the hidden section of the document, and wherein determining the at least one suggestion comprises:
receiving, by a mobile computing device, the at least one suggestion from a server;
caching the at least one suggestion in a local memory location; and
determining to display the at least one suggestion;
displaying the at least one suggestion in proximity to the content entry area;
receiving an additional input to the content entry area;
determining additional suggestions to display based on the received additional input, wherein determining the additional suggestions comprise:
accessing the at least one suggestion in the local memory location; and
determining the additional suggestions using the at least one suggestion in the local memory location, wherein the additional suggestions are related to the at least one suggestion, and wherein the additional suggestions comprise the hidden section of the document; and
displaying the additional suggestions in proximity to the content entry area.

2. The method of claim 1, further comprising displaying an option to display a Software Input Panel (SIP) when automatically displaying the at least one suggestion.

3. The method of claim 1, wherein determining the at least one suggestion comprises determining unique content from an area in the document.

4. The method of claim 1, wherein determining the at least one suggestion for content to enter at the content entry area comprise including content determined from hidden data that is not displayed with the displayed document.

5. The method of claim 1, wherein determining when to display the at least one suggestion comprises displaying the at least one suggestion after detecting a pause of a specified duration after a content entry is made to the content entry area.

6. The method of claim 1, wherein determining at least one suggestion comprises receiving the at least one suggestion determined from hidden data and non-hidden data from at least one of: an online service, a server or some other external source.

7. The method of claim 1, wherein determining at least one suggestion comprises obtaining hidden data at web client from an online service, a server or some other external source.

8. The method of claim 1, wherein determining when to display the at least one suggestion comprises determining when the content comprises duplicate entries.

9. The method of claim 1, wherein the document comprises at least one spreadsheet, wherein the content entry area comprises at least one cell of the at least one spreadsheet, and wherein the hidden section of the document comprises at least one hidden cell of the at least one spreadsheet.

10. A computer-readable medium storing computer-executable instructions for displaying suggestions for data entry through user interaction, the instructions, when executed by at least one processor cause a computing device to perform, comprising:

receiving a selection of a content entry area shown on a display of a portion of a document, wherein the document comprises a hidden section and a non-hidden section, and wherein the portion of the document comprises at least a part of the non-hidden section;

determining at least one suggestion for completing data entry, wherein the at least one suggestion for data input is based on the selected content entry area and at least the hidden section of the document, and wherein determining the at least one suggestion comprises:

receiving the at least one suggestion from a server; and caching the at least one suggestion in a local memory location;

determining to display the at least one suggestion;

automatically displaying the at least one suggestion;

receiving an additional input to the content entry area;

determining additional suggestions to display based on the received additional input, wherein determining the additional suggestions comprises:

accessing the at least one suggestion in the local memory location; and determining the additional suggestions using the at least one suggestion in the local memory location, wherein the additional suggestions are related to the at least one suggestion, and wherein the additional suggestions comprise the hidden section of the document; and displaying the additional suggestions.

11. The computer-readable medium of claim 10, wherein determining at least one suggestions comprises determining unique content from an area in the document that is related to the content entry area.

12. The computer-readable medium of claim 10, wherein determining at least one suggestion for content to enter at the content entry area comprise including content determined from the hidden section that is not displayed with the displayed document.

13. The computer-readable medium of claim 10, wherein determining when to display the at least one suggestion comprises displaying the at least one suggestion after detecting a pause of a specified duration after a content entry is made to the content entry area.

14. The computer-readable medium of claim 10, wherein determining at least one suggestion comprises receiving the at least one suggestion determined from hidden data and non-hidden data from at least one of: an online service, a server, or some other external source.

15. The computer-readable medium of claim 10, wherein determining when to display the at least one suggestion comprises determining that the content includes duplicate entries.

16. The computer-readable medium of claim 10, wherein the document comprises at least one spreadsheet, wherein the content entry area comprises at least one cell of the at least one spreadsheet, and wherein the hidden section of the document comprises at least one hidden cell of the at least one spreadsheet.

17. A system for displaying suggestions, comprising:

a processor and memory;

an operating environment executing using the processor; and a suggestion manager that is configured to perform actions, the actions comprising:

receiving a selection of a content entry area shown on a display of a portion of a document, wherein the document comprises a hidden section and a non-hidden section, and wherein the portion of the document comprises at least a part of the non-hidden section;

determining at least one suggestion for completing data entry, wherein the at least one suggestion for data entry is based on the selected content entry area and at least the hidden section, and wherein determining the at least one suggestion comprises:

receiving the at least one suggestion from a server; and caching the at least one suggestion in a local memory location;

determining to display the at least one suggestion;

displaying the at least one suggestion in proximity to the content entry area;

receiving an additional input to the content entry area;

determining additional suggestions based on the received additional input, wherein determining the additional suggestions comprises:

accessing the at least one suggestion in the local memory location; and determining the additional suggestions using the at least one suggestion in the local memory location, wherein the additional suggestions are related to the at least one suggestion, and wherein the additional suggestions comprise the hidden section of the document; and displaying the additional suggestions.

18. The system of claim 17, wherein determining to display the at least one suggestion comprises displaying the at least one suggestion after detecting a pause of a specified duration after a content entry is made to the content entry area.

19. The system of claim 17, wherein determining at least one suggestion further comprises receiving the at least one suggestion determined from the non-hidden section or an external source.

20. A system of claim 17, wherein the document comprises at least one spreadsheet, wherein the content entry area comprises at least one cell of the at least one spreadsheet, and wherein the hidden section comprises at least one hidden cell of the at least one spreadsheet.

* * * * *